United States Patent
Sledd et al.

(10) Patent No.: US 9,572,336 B2
(45) Date of Patent: Feb. 21, 2017

(54) REMOVABLE INSERT FOR A HORSESHOE

(71) Applicant: FOUR SCORNED, LLC, Paris, KY (US)

(72) Inventors: Kenney C. Sledd, Paris, KY (US); Mark A. Taulbee, Lexington, KY (US)

(73) Assignee: FOUR SCORNED, LLC, Paris, KY (US)

( * ) Notice: Subject to any disclaimer, the term of this patent is extended or adjusted under 35 U.S.C. 154(b) by 160 days.

(21) Appl. No.: 13/667,433

(22) Filed: Nov. 2, 2012

(65) Prior Publication Data

US 2013/0112437 A1 May 9, 2013

Related U.S. Application Data

(60) Provisional application No. 61/555,080, filed on Nov. 3, 2011.

(51) Int. Cl.
*A01L 1/04* (2006.01)

(52) U.S. Cl.
CPC ........................ *A01L 1/04* (2013.01)

(58) Field of Classification Search
CPC ................ A01L 1/00; A01L 1/04; A01L 7/04
USPC ..................... 168/4, 42, 31, 11, 32
See application file for complete search history.

(56) References Cited

U.S. PATENT DOCUMENTS

| | | | |
|---|---|---|---|
| 189,692 A * | 4/1877 | Brightman | 168/35 |
| 292,302 A * | 1/1884 | Hall | 168/42 |
| 1,187,332 A * | 6/1916 | Keller | 168/31 |
| 1,361,744 A * | 12/1920 | Porter | 168/41 |
| 1,458,648 A * | 6/1923 | Freeman | 168/41 |
| 3,460,627 A * | 8/1969 | Teixeira | 168/29 |
| 3,476,190 A * | 11/1969 | Jacques et al. | 168/4 |
| 3,970,149 A * | 7/1976 | Featherstone | A01L 1/00 168/25 |
| 4,122,900 A * | 10/1978 | Barr et al. | 168/12 |
| 4,139,061 A * | 2/1979 | Vogel, Jr. | 168/41 |
| 5,027,904 A * | 7/1991 | Miller et al. | 168/4 |
| 5,105,891 A * | 4/1992 | Noffsinger | A01L 7/02 168/13 |
| 5,205,362 A * | 4/1993 | Noffsinger | A01L 7/02 168/13 |
| 5,213,163 A * | 5/1993 | Schaffer | 168/4 |
| 5,740,865 A * | 4/1998 | Turk | 168/4 |
| 6,082,462 A * | 7/2000 | Lyden | 168/24 |
| 6,401,828 B1 * | 6/2002 | Rafeld | 168/12 |
| 6,779,609 B2 * | 8/2004 | Forstner et al. | 168/4 |
| 7,624,811 B2 * | 12/2009 | Coloumbe | 168/23 |

(Continued)

OTHER PUBLICATIONS

Stovall, Tom, "Horseshoeing Methods from A to Zeta", 1997, <http://web.wt.net/~stovall/horsesho.htm>.*

(Continued)

*Primary Examiner* — Kathleen Alker
*Assistant Examiner* — Michael Wang
(74) *Attorney, Agent, or Firm* — King & Schickli, PLLC

(57) ABSTRACT

A horseshoe connected to a hoof of a horse for use on different surfaces without removing the horseshoe from the horse. The horseshoe includes an insert removably connected to the horseshoe. The insert may be positioned within a recess located on the bottom surface of the horseshoe. The insert may have a toe grab for providing traction. A related method of inserting a toe grab to a horseshoe without removing the horseshoe from a horse.

13 Claims, 5 Drawing Sheets

(56) References Cited

U.S. PATENT DOCUMENTS

2012/0118587 A1* 5/2012 Patek .............................. 168/4

OTHER PUBLICATIONS

"Horseshoe", Wikipedia, <https://en.wikipedia.org/wiki/Horseshoe>.*
"All about horseshoes", <http://www.sportpolo.com/barn/horseshoes.htm>.*
"Horseshoes", Horse Racing in Japan, <http://japanracing.jp/en/information/horsemensinformation/ horseshoes.html>.*

* cited by examiner

REMOVABLE INSERT FOR A HORSESHOE

This application claims the benefit of U.S. Provisional Patent Application Ser. No. 61/555,080, filed Nov. 3, 2011, the disclosure of which is incorporated herein by reference.

TECHNICAL FIELD

This disclosure relates to horseshoes for use with the hoof of various equine breeds and, more particularly, to a horseshoe having an insert for use in training and racing thoroughbred horses as well as on other breeds of horses for other types of equine competitions.

BACKGROUND

A horseshoe is a fabricated U-shaped plate attached to the bottom of a horse's hoof to provide greater traction. Depending on the type of work the horse is performing, horseshoes can protect the horse's hoof as well as the horse's muscles, bones and tendons from injury. Generally, a horseshoe is made out of metal, but they are available in a variety of materials and styles depending on their particular purpose or a horse's specific need. The horseshoe is typically nailed through the insensitive hoof wall, but may also be attached to the hoof via an adhesive. This tedious task is usually performed by a farrier (or blacksmith), who specializes in the preparation of feet, assessing potential lameness issues and fitting appropriate shoes.

Although horseshoes are used on a number of different breeds of horses, horseshoes are most commonly associated with thoroughbred horses, which are bred mainly for racing. As noted above, in addition to protection, horseshoes are often used to provide better traction for a horse, particularly a thoroughbred in racing or training conditions. Thoroughbred horses race, train and exercise on a number of different surfaces, such as dirt, grass and synthetic surfaces. Furthermore, thoroughbred horses race, train and exercise in different weather and track conditions, such as fast, firm, wet and muddy.

The particular surface and track condition as well as the individual horse's characteristics often dictate the type of horseshoe that will be used. For example, a plain horseshoe may be used in benign racing conditions, i.e., on a fast dirt track. On the other hand, a horseshoe may have a toe grab that extends downwardly at the toe of the horseshoe to provide additional traction for a horse in non-ideal track conditions. Of course, it should be appreciated that horseshoes come in a variety of different styles, such as corrective bar shoes and shoes with one of more calks or projections. Importantly, the various styles of horseshoes are typically manufactured in the condition for which they are used by the farrier, i.e., you cannot convert a plain horseshoe into a horseshoe having a toe grab without removing the first shoe from the horse's hoof and re-shodding the horse with a second shoe.

Depending on the horse's need for its training or racing schedule, a farrier in consultation with the horse's owner and trainer selects the desired shoe and fastens it to the horse's hoof. If the training or racing conditions change or the horse needs a different type of shoe for any reason, i.e., it needs a shoe with a toe grab rather than a plain shoe, the farrier must remove the original horseshoe and replace it (a process known as re-shodding), which can be a rigorous, time-consuming and expensive process. As discussed above, since the toe grab is soldered onto the horseshoe by the manufacturer of the horseshoe, the farrier must replace the entire shoe if a horse needs a horseshoe with a toe grab rather than a plain horseshoe.

Although re-shodding is often necessary, it creates a number of undesirable consequences. For example, re-shodding can be a time-consuming process to remove the old shoes and replace them with the new shoes and shoe changes are often demanded under strict time constraints, i.e., shortly before a race. Furthermore, there is an additional expense for the horse owner because a farrier must be paid to re-shod the horse. Finally, and perhaps most importantly, re-shodding increases the risk of injury to the horse's hoof from multiple shoe changes.

Accordingly, a need is identified for a more economical, versatile and efficient alternative to the one-piece horseshoe. Specifically, a need exists for a horseshoe that may be easily manipulated to change from a plain horseshoe to a horseshoe with a toe grab and vice-versa without the need for re-shodding. As a result, the time and expense of re-shodding a horse's shoes would be greatly reduced or eliminated altogether. Furthermore, a need exists for minimizing the risk of hoof-related injuries from multiple shoe changes.

SUMMARY

In accordance with one aspect of the disclosure, a horseshoe connected to a hoof of a horse that may be adapted for use on different surfaces without removing the horseshoe from the horse is provided. The horseshoe includes an insert removably connected to the horseshoe. The insert may be positioned within a recess located in the bottom surface of the horseshoe. Furthermore, the insert may be removably connected to the closed end of the substantially U-shaped horseshoe. When positioned within the recess of the horseshoe, the insert may be substantially flush with the bottom surface of the horseshoe.

In one embodiment, the horseshoe includes at least one opening that corresponds to at least another opening in the insert. A fastener, such as a screw, is provided for inserting through the at least one opening in the horseshoe and through the at least another opening in the insert to removably connect the insert to the horseshoe. The insert may have a toe grab. The toe grab extends vertically above an outer edge of the horseshoe and extends horizontally greater than the length of the insert. The horseshoe and the insert may be made from the same or different material.

Another related aspect of the disclosure is an improvement in a horseshoe including a plate for attaching to a hoof of a horse. Specifically, the improvement is an insert removably connected to the plate for allowing the insert to be replaced without removing the horseshoe from the hoof of the horse. The insert may have a toe grab for providing additional traction.

Related methods also form a part of the disclosure.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized and that process or other changes may be made without departing from the scope of the disclosure. The following detailed description is not to be taken in a limiting sense, and the scope of the invention is defined only by the appended claims and their equivalents. In accordance with the disclosure, a horseshoe having a removable insert is hereinafter described.

Figure 1:
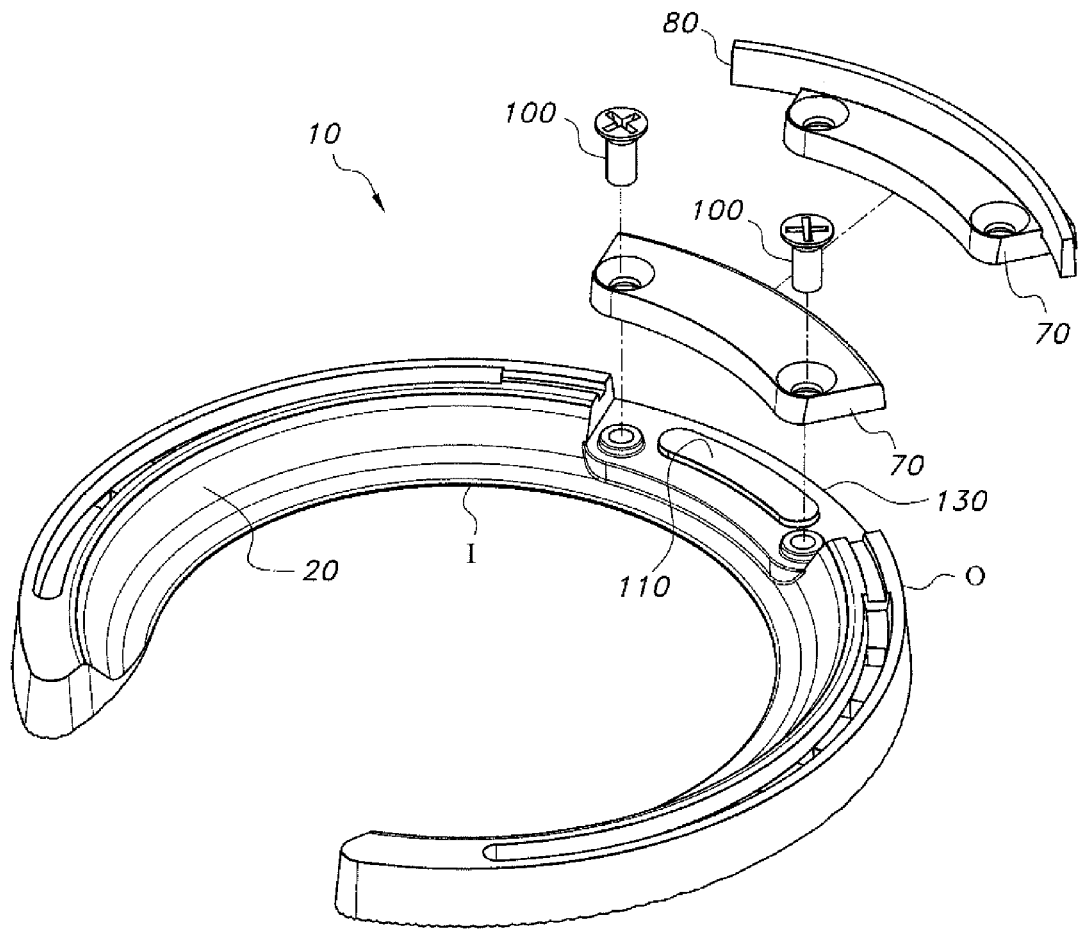
FIG. 1 is an exploded perspective view of a horseshoe with an insert forming one aspect of this disclosure.
Figure 2:
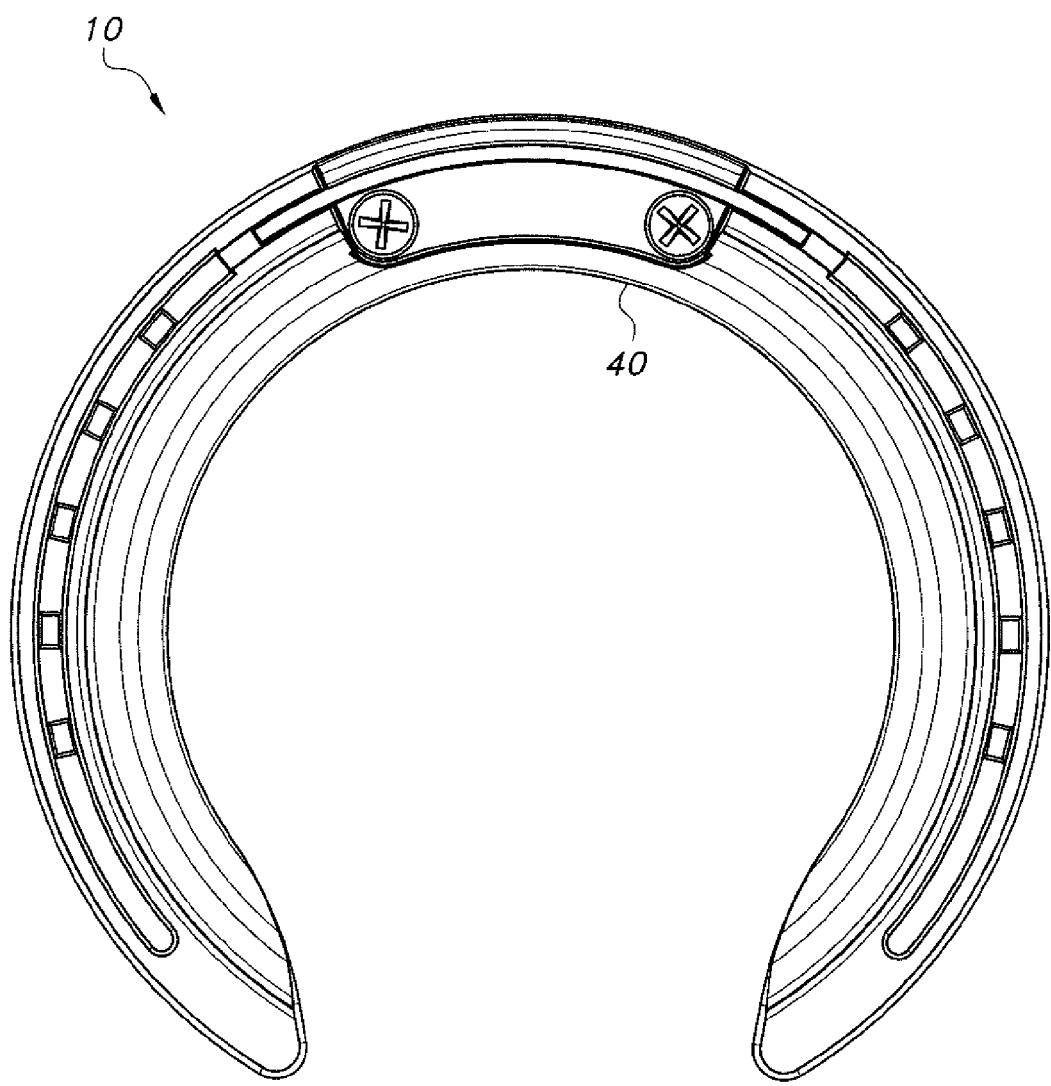
FIG. 2 is a top view of the bottom side of a horseshoe with an insert forming one aspect of this disclosure.
Figure 3:
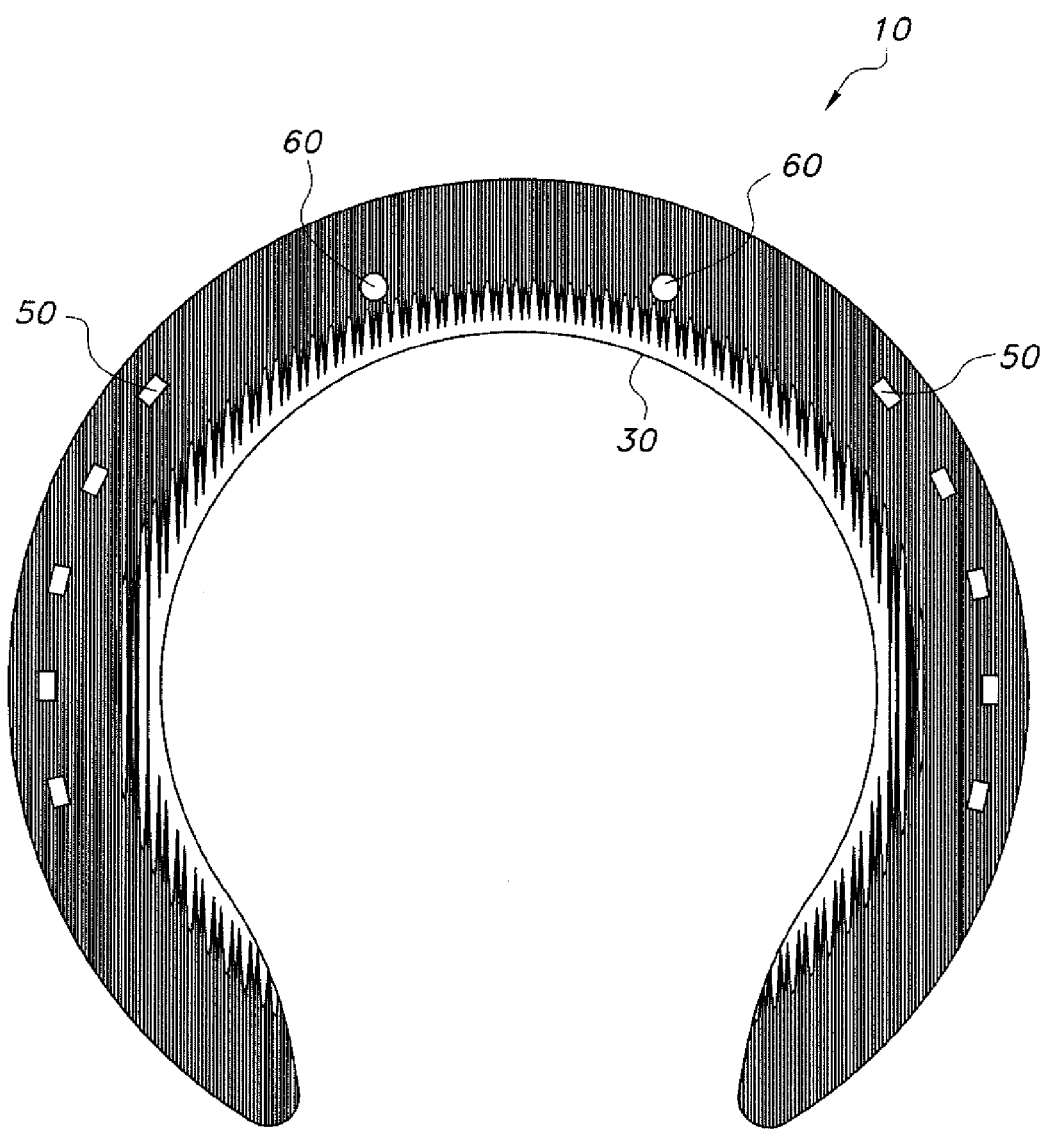
FIG. 3 is a top view of the top side of a horseshoe forming one aspect of this disclosure.
Figure 4:
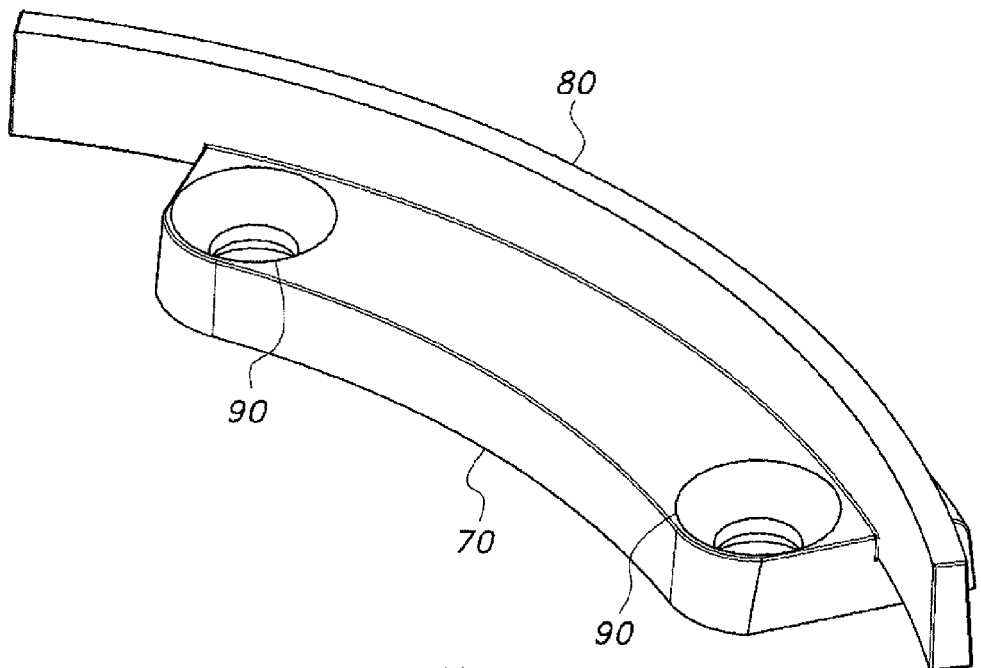
FIG. 4 is a perspective top view of an insert having a grab forming one aspect of this disclosure.

Reference is now made to FIG. 1, which is a perspective view illustrating one embodiment of a horseshoe 10 that may be used as both a front shoe and a rear shoe for a horse. The horseshoe 10 includes a master plate or base 20, which may be substantially U-shaped (the toe portion of the master plate 20 is the portion at the closed-end of the U opposite the open end of the U). The master plate 20 may be cast using a variety of materials, such as aluminum, steel, plastic, fiberglass, rubber or any other suitable material. The master plate 20 has a top surface 30 and a bottom surface 40. As shown in FIG. 2, the top surface 30 of the master plate is substantially flat for attaching directly to the horse's hoof. On the other hand, the bottom surface 40 (as shown in FIGS. 3 and 4) of the master plate 20 is the part of the horseshoe 10 that contacts the ground when the horse's hoof touches the ground. The exact shape, dimensions and specifications of the horseshoe may vary to fit the horse or owner's needs.

As shown in FIGS. 2 and 3, the master plate 20 has a plurality of openings 50 spaced along the entirety of the plate. The openings extend through the top and bottom surfaces for the farrier to attach the top surface of the horseshoe 10 directly to the horse's hoof, such as by using nails that are nailed through the openings 50. Aside from the toe portion discussed in more detail below, the master plate 20 is typically representative of a standard horseshoe. For example, the master plate 20 may be different sizes and styles for the various equine breeds, the particular activity for the horse and the horse's specific characteristics. Furthermore, the master plate 20 may have tapered ends at the open end of the U and a peripheral surface on the bottom surface 40 that slopes inward such that the inner edge (I) of the master plate is narrower than the outer edge (0) of the master plate. The bottom surface 40 may also have various projections or calks permanently attached to the horseshoe to improve traction.

As perhaps best seen in FIG. 1, a section of the toe portion on the bottom surface of the master plate is missing such that there is a recess or cavity 130 between the outer edges of the master plate 20. In the cavity 130, the master plate 20 has at least one opening on the bottom surface for inserting a fastening device, such as a screw. It should be appreciated that other types of fastening devices may be used. In the embodiment shown in FIG. 1, the master plate 20 has two openings 60 on the bottom surface 40 in the cavity. The openings may be threaded for increasing the thread engagement with the fastening device. In the cavity 130 of the bottom surface 40 of the master plate 20, a boss 110 is positioned above the at least one opening. The boss 110 may be raised and substantially oval shaped.

An insert 70 may be positioned in the recess on the bottom surface of the master plate 20 and may be substantially flush with the bottom surface 40 of the horseshoe 10. The insert 70 may be cast using the same or different material as the master plate, such as being made of aluminum, steel, plastic, fiberglass, rubber or any other suitable material. As shown in FIG. 1, the insert 70 may or may not have a toe grab 80. The toe grab 80 may be cast as part of the insert 70 such that it cannot be removed without damaging the insert from its intended use. As a result, there are typically at least two different inserts that may be removably inserted into the master plate 20 depending on whether a toe grab is desired, i.e., one insert having a toe grab (see FIGS. 4 and 5) and another insert without a toe grab (see FIGS. 6 and 7). The specific variations of the insert 70 including the geometry and angle of the insert may vary.

Figure 5:
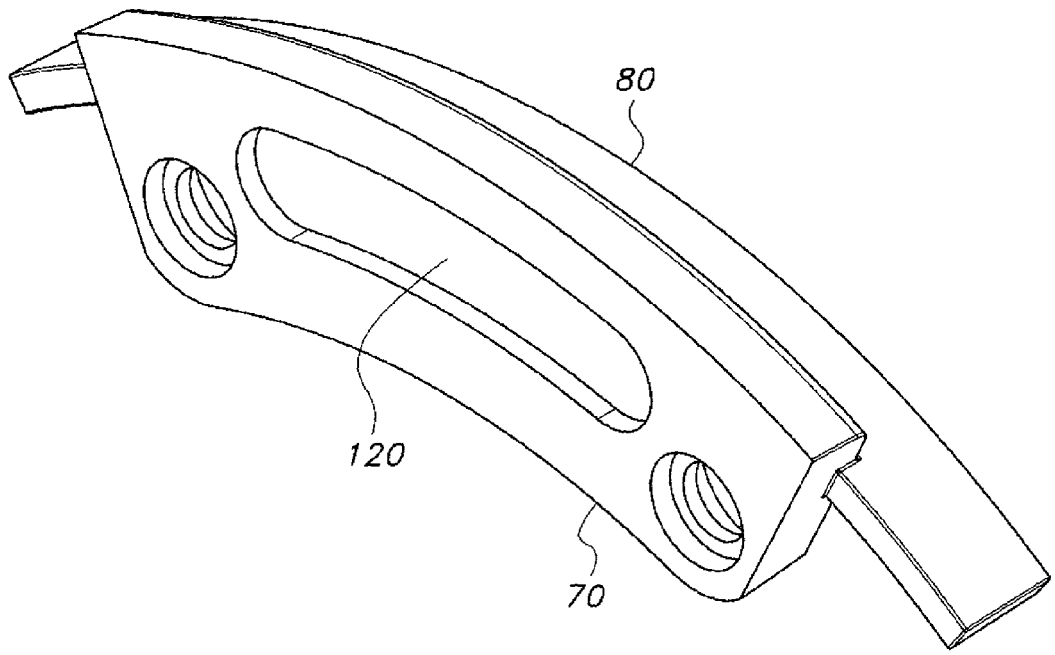
FIG. 5 is a perspective bottom view of the insert having a grab forming one aspect of this disclosure.
Figure 6:
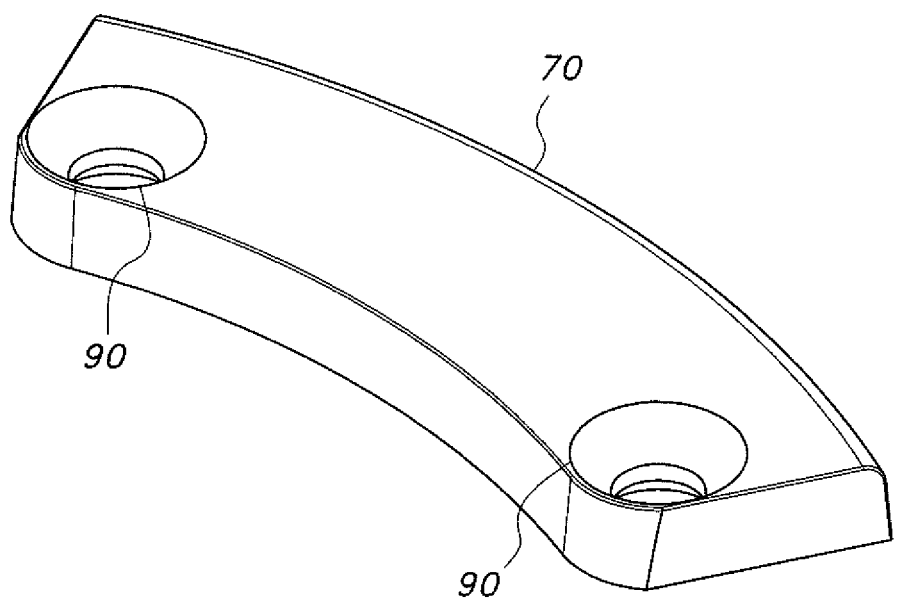
FIG. 6 is a perspective top view of an insert without a grab forming one aspect of this disclosure.

The toe grab 80 may be a substantially continuous element that extends along the groove in the top surface of the insert. The height of the toe grab 80 may vary depending on a number of factors, such as a taller grab for greater traction in wet conditions while a shorter grab may be desired under drier conditions. In any event, the toe grab 80 typically extends vertically higher than the outer edge of the master plate 20. The length of the toe grab 80 may also vary. As shown in FIGS. 4 and 5, the toe grab 80 may extend greater than the length of insert 70. In other embodiments not shown, the toe grab 80 may be shorter than the length of the insert 70. In addition to variations in the height and length of the toe grab, the angle of the toe grab may also vary.

The insert 70 has at least one opening for aligning with the opening 60 in the master plate 20, such that a fastener may be inserted through the opening in the insert and the opening in the master plate to removably connect the insert 70 to the master plate 20. As shown in FIGS. 4-7, the insert has two openings 90 corresponding equally to the number of openings 60 in the master plate 20. Similar to the openings in the master plate 20, the openings 90 in the insert 70 may be threaded to increase the thread engagement with the fastening devices. A pair of fastening devices 100, such as screws (as shown in FIG. 1) may be used to removably secure the insert 70 to the master plate 20. Of course, it should be appreciated that other types of fasteners as well as an adhesive may be used to secure the insert 70 to the master plate 20.

The top surface of the insert 70 is shaped and styled substantially the same as the master plate 20, such that it fits within the recess of the master plate 20. Furthermore, the insert 70 is positioned within the recess of the master plate 20 such that it substantially flush with the bottom surface 30 of the master plate 20 and no gap exists. In the embodiment shown in FIG. 1, the insert 70 has two spaced openings 90 at the lower end, which extend through the top and bottom surface of the insert 70. The spaced openings 90 are adjacent the inner edge (I) of the horseshoe when the insert 70 is positioned in the master plate 20. The top surface of the insert 70 has a continuous groove co-planar with the apertures but closer to the outer edge (0) of the horseshoe 10. When the insert 70 is properly positioned within the recess of the master plate 20, the continuous groove aligns with a groove in the master plate 20 near the outer edge of the horseshoe 10.

Figure 7:
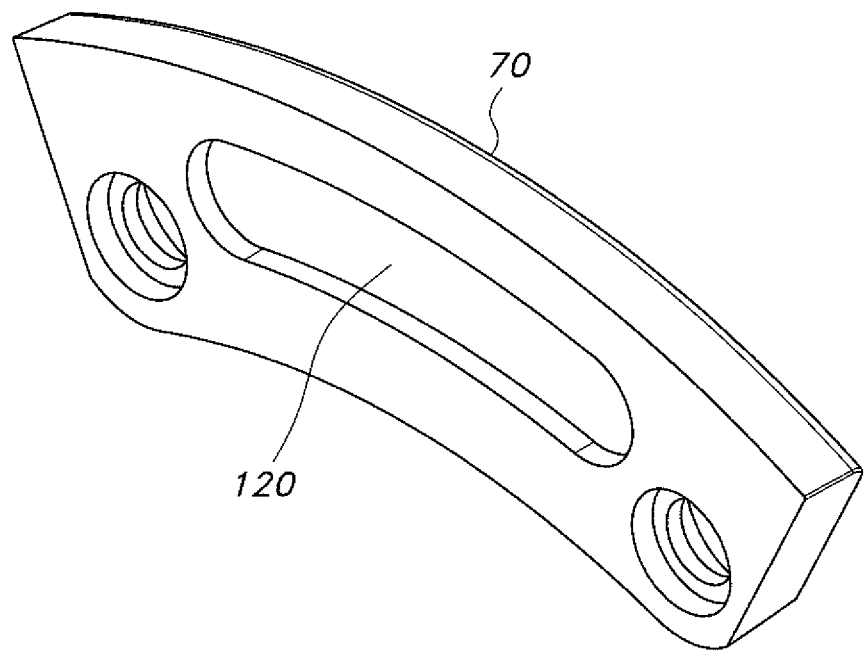
FIG. 7 is a perspective bottom view of the insert without a grab forming one aspect of this disclosure.

As shown in FIGS. 5 and 7, the bottom surface of the insert 70 is substantially flat so it fits snugly within the recess in the master plate 20 with the exception of a boss 120, which may be recessed. The recessed boss 120 in the insert mates with the raised boss 110 in the master plate 20 to provide lateral strength perpendicular to the horse's weight in the same direction as gravity. The bosses 110, 120 prevent the insert 70 from sliding with a failure mode of sheer against the fastener(s) holding the insert 70 and the master plate 20 together. Specifically, the bosses along with the threaded openings accommodate sheering forces generated by the horse's foot on the horseshoe/insert interface as a result of sliding, i.e., a hard stop by the horse.

In use, the insert 70 allows the user to change the type of insert used with the horseshoe 10 when necessary without changing the entire horseshoe 10, which is advantageous for the reasons discussed above. Namely, the use of an insert greatly reduces the time, labor and expense of adding and removing the entire horseshoe from the horse's hoof when a toe grab is desired. For example, if the track conditions on the day of a thoroughbred horse race become wet, the insert without a toe grab may be easily replaced by an insert having a toe grab by inserting the insert with the toe grab into the horseshoe 10 to improve the horse's traction with the wet surface of the track. As a result, the horseshoe with the removable insert 70 is adaptable for use on all racing surfaces and track conditions.

Importantly, knowledgeable personnel such as skilled horsemen may be able to quickly perform the change once the master plate 20 has already been applied by a farrier, which alleviates the need for a farrier to replace the entire shoe, which saves time and money. Specifically, if a toe grab 80 is desired, a skilled horseman may simply use a screwdriver or other similar tool to remove the insert 70 without a toe grab 80 from the master plate 20 by removing the fasteners 100, such as by unscrewing the screws. The insert 70 without a toe grab may then be removed from the master plate 20 and replaced with the insert 70 having a toe grab 80. Once the insert 70 having a toe grab 80 is positioned in the master plate 20, the fasteners may be placed through the openings and apertures and tightened to secure the insert with the toe grab to the horseshoe. Advantageously, the insert is available in various configurations and materials and is adaptable to all equine related industries.

The foregoing descriptions of various embodiments are provided for purposes of illustration, and are not intended to be exhaustive or limiting. Modifications or variations are also possible in light of the above teachings. The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

The invention claimed is:

1. A horseshoe for thoroughbred horse racing having a toe portion and a heel portion for connecting to a hoof of a horse adaptable for use on different surfaces without removing the horseshoe from the horse, comprising:
 a cavity formed in the center of the toe portion, wherein said cavity includes a substantially oval shaped raised boss;
 a first groove located adjacent to an outer edge of the horseshoe extending to a first end of the cavity and a corresponding second groove located adjacent to the outer edge of the horseshoe extending to an opposite end of the cavity;
 a removable insert having a toe grab connected thereto, wherein said insert includes an outer edge, an inner edge, two side edges, and a substantially oval shaped recessed boss;
 wherein said insert is positioned within the cavity such that the inner and outer edges of the insert do not extend laterally from an inner edge or the outer edge of the horseshoe and such that the raised boss mates with the recessed boss to provide lateral strength perpendicular to the horse's weight in the same direction as gravity and to prevent the insert from sliding, and
 wherein the toe grab is positionable between the first and corresponding second grooves of the horseshoe; and
 wherein opposing ends of the toe grab extend beyond the side edges of the insert such that, when the insert is positioned within the cavity, the ends of the toe grab are positioned within the first groove and the second groove.

2. The horseshoe according to claim 1, wherein said horseshoe is substantially U-shaped.

3. The horseshoe according to claim 1, further including at least one opening corresponding to at least another opening in the insert.

4. The horseshoe according to claim 1, further including at least one fastener for removably connecting the insert to the horseshoe.

5. The horseshoe according to claim 1, wherein the insert is substantially flush with the bottom surface of the horseshoe.

6. The horseshoe according to claim 1, wherein the horseshoe and the insert are made from a same material.

7. The horseshoe according to claim 1, wherein the horseshoe and the insert are made from a different material.

8. In a horseshoe for thoroughbred horse racing including a plate having an inner edge and an outer edge for attaching to a hoof of a horse, said plate having a recessed section, a first groove located adjacent to an outer edge of the plate extending to a first end of the recessed section and a corresponding second groove located adjacent to the outer edge of the plate extending to an opposite end of the recessed section, the improvement comprising an interchangeable insert having an outer edge, an inner edge, and two side edges, and an arcuate-shaped toe grab having opposing ends extending beyond the side edges of the insert, the toe grab casted to the insert in a substantially permanent manner, wherein said insert is removably connected to the plate in the recessed section such that the inner and outer edges of the insert do not extend laterally from the inner or outer edges of the plate and the ends of the toe grab are positioned within the first groove and the second groove for allowing said insert to be replaced without removing the horseshoe from the hoof of the horse.

9. The improvement of claim 8, wherein the toe grab extends vertically from an outer edge of the horseshoe.

10. The improvement of claim 8, wherein the interchangeable insert removably connects to a bottom surface of the horseshoe.

11. A method of inserting one of a plurality of arcuate-shaped toe grabs having varying heights and lengths to a horseshoe for thoroughbred horse racing having a first groove and a corresponding second groove located adjacent to an outer edge without removing the horseshoe from a horse, comprising:
 providing an insert with the one of the plurality of arcuate-shaped toe grabs permanently casted within a corresponding groove of the insert, the insert having an outer edge, an inner edge, and two side edges, wherein opposing ends of the toe grab extend beyond the side edges of the insert;

positioning the insert with the one of the plurality of arcuate-shaped toe grabs in a cavity formed in the horseshoe such that the inner and outer edges of the insert do not extend laterally beyond an inner edge or the outer edge of the horseshoe;

positioning the ends of the toe grab within the first and corresponding second grooves, respectively, of the horseshoe, the first groove located adjacent to an outer edge of the horseshoe extending to a first end of the cavity and the corresponding second groove located adjacent to the outer edge of the horseshoe extending to an opposite end of the cavity; and attaching the insert with the one of the plurality of arcuate-shaped toe grabs to the horseshoe.

12. The method according to claim 11, wherein the attaching step including providing at least one fastener for securing the insert with the one of the plurality of arcuate-shaped toe grabs to the horseshoe.

13. The method according to claim 11, further comprising positioning the insert in the cavity of the horseshoe such that the groove of the horseshoe and the corresponding groove of the insert are aligned.

* * * * *